(12) United States Patent
Okatake et al.

(10) Patent No.: US 8,874,143 B2
(45) Date of Patent: Oct. 28, 2014

(54) INFORMATION PROCESSING APPARATUS, INFORMATION PROCESSING METHOD, INFORMATION PROCESSING PROGRAM, AND RECORDING MEDIUM HAVING INFORMATION PROCESSING PROGRAM RECORDED THEREIN

(71) Applicant: Rakuten, Inc., Tokyo (JP)

(72) Inventors: Masashi Okatake, Shinagawa-ku (JP); Hiromitsu Ishii, Shinagawa-ku (JP)

(73) Assignee: Rakuten, Inc., Tokyo (JP)

( * ) Notice: Subject to any disclaimer, the term of this patent is extended or adjusted under 35 U.S.C. 154(b) by 0 days.

(21) Appl. No.: 14/006,137

(22) PCT Filed: Dec. 28, 2012

(86) PCT No.: PCT/JP2012/084184
§ 371 (c)(1),
(2), (4) Date: Sep. 19, 2013

(65) Prior Publication Data
US 2014/0187196 A1    Jul. 3, 2014

(51) Int. Cl.
H04W 24/00    (2009.01)

(52) U.S. Cl.
USPC ............... 455/456.3; 455/405; 455/456.1

(58) Field of Classification Search
USPC ............... 455/404.2, 405, 414.1–414.4, 455/456.1–457
See application file for complete search history.

(56) References Cited

U.S. PATENT DOCUMENTS

| 8,412,237 B1* | 4/2013 | Ohme .................. 455/456.3 |
| 2004/0097244 A1* | 5/2004 | Yamazaki et al. ....... 455/456.3 |
| 2012/0190339 A1* | 7/2012 | Abe et al. .............. 455/411 |

FOREIGN PATENT DOCUMENTS

| JP | 8-36041 A | 2/1996 |
| JP | 2010-124222 A | 6/2010 |
| JP | 2012-205020 A | 10/2012 |

OTHER PUBLICATIONS

International Search Report for PCT/JP2012/084184 dated Feb. 12, 2013.

* cited by examiner

*Primary Examiner* — George Eng
*Assistant Examiner* — Marcus Hammonds
(74) *Attorney, Agent, or Firm* — Sughrue Mion, PLLC

(57) ABSTRACT

An information processing apparatus: when a time indicated by the one access history associated with the one user corresponds to the use period included in the one use history associated with the user, specifies a position specified based on the user position specifying information included in the use history, as a position at which the mobile terminal is present at the time of the access related to the access history; and associates and outputs information which indicates the specified position and information which indicates a communication carrier which operates the mobile communication network through which the access related to the access history is made.

8 Claims, 5 Drawing Sheets

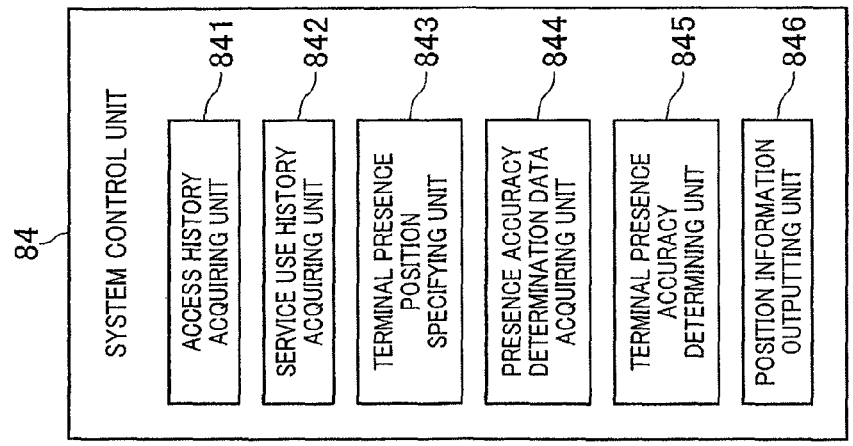
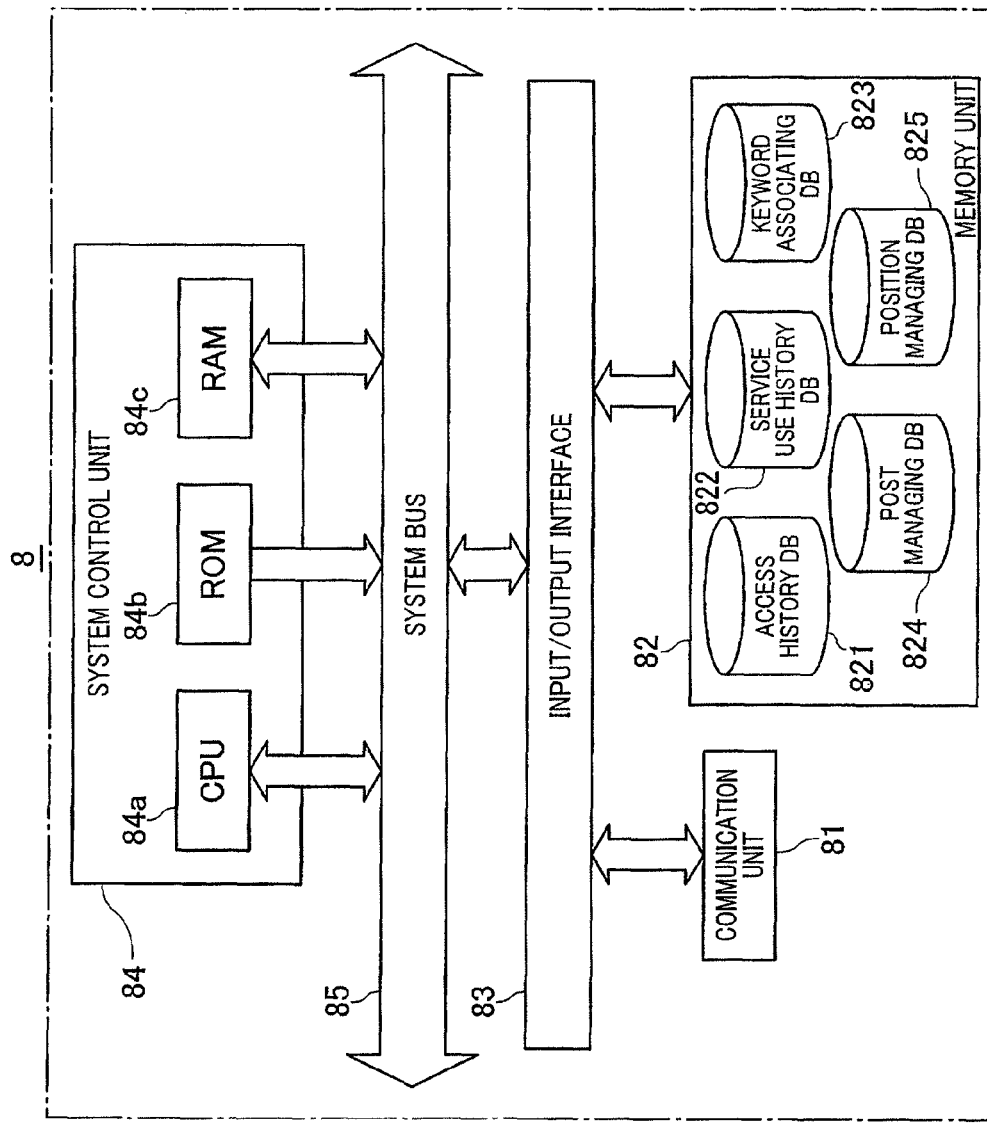

FIG. 4A

ACCESS HISTORY DATABASE 821

| DATE AND TIME | TYPE | USER ID | UA | TRANSMISSION SOURCE IP ADDRESS | PROCESSED FLAG |
|---|---|---|---|---|---|
| 16:00 DECEMBER 6, 2012 | LOG IN | U00001 | Ra···· | 1xx.0.0.1 | 1 |
| 16:00 DECEMBER 7, 2012 | TRANSMISSION AND RECEPTION OF ELECTRONIC MAIL | U00002 | GGG··· | ····· | |
| ····· | | | | | |

FIG. 4B

SERVICE USE HISTORY DATABASE 822

| SERVICE USE PERIOD | SERVICE USE PLACE | USER ID |
|---|---|---|
| DECEMBER 6, 2012 | AA HOTEL, 1-2, ··· ○○ WARD, NAGOYA CITY | U00001 |
| 16:00 ~, DECEMBER 7, 2012 | ATSUTA SHRINE, JINGU, ATSUTA WARD, NAGOYA CITY | U00002 |
| ····· | | |

FIG. 4C

KEYWORD ASSOCIATING DATABASE 823

| POSITION INFORMATION | | KEYWORD | |
|---|---|---|---|
| ADDRESS | FACILITY NAME | FLOOR NUMBER | |
| 1-2, ··· ○○ WARD, NAGOYA CITY | AA HOTEL | 1 | AA HOTEL / 3-MINUTE WALK FROM x x STATION / LOBBY |
| 1-2, ··· ○○ WARD, NAGOYA CITY | AA HOTEL | 2 | AA HOTEL / 3-MINUTE WALK FROM x x STATION / RESTAURANT |
| JINGU, ATSUTA WARD, NAGOYA CITY | ATSUTA SHRINE | – | TREASURE MUSEUM / 5-MINUTE WALK FROM ATSUTA JINGU STATION |
| ····· | | | |

FIG. 4D

POST MANAGING DATABASE 824

| POST DATA | IMAGE DATA | POSITION INFORMATION | USER ID | UA | TRANSMISSION SOURCE IP ADDRESS |
|---|---|---|---|---|---|
| NOW, AT LOBBY OF AA HOTEL. 16:00 DECEMBER 6, 2012 | aaa.jpg | 35.633998, 139.715828 | U00001 | Ra···· | 1xx.0.0.1 |
| AT TREASURE MUSEUM. 16:00 DECEMBER 7, 2012 | bbb.jpg | 55.633998, 119.715528 | U00002 | GGG··· | – |
| ····· | | | | | |

FIG. 4E

POSITION MANAGING DATABASE 825

| TERMINAL PRESENCE POSITION INFORMATION | COMMUNICATION CARRIER INFORMATION | USER ID | DATE AND TIME |
|---|---|---|---|
| AA HOTEL, 1-2, ··· ○○ WARD, NAGOYA CITY | Raxx | U00001 | 16:00 DECEMBER 6, 2012 |
| ATSUTA SHRINE, JINGU, ATSUTA WARD, NAGOYA CITY | GGG | U00002 | 16:00 DECEMBER 7, 2012 |
| ····· | | | |

INFORMATION PROCESSING APPARATUS, INFORMATION PROCESSING METHOD, INFORMATION PROCESSING PROGRAM, AND RECORDING MEDIUM HAVING INFORMATION PROCESSING PROGRAM RECORDED THEREIN

CROSS REFERENCE TO RELATED APPLICATIONS

This application is a National Stage of International Application No. PCT/JP2012/084184 filed Dec. 28, 2012, the contents of which are incorporated herein by reference in their entirety.

TECHNICAL FIELD

The present invention relates to a technical field of an apparatus and a method which enable a mobile terminal to specify a position at which the mobile terminal can perform communication through a mobile communication network.

BACKGROUND ART

There are needs of checking whether or not a mobile terminal can perform communication through a mobile communication network operated by a specific communication carrier (electric communication business operator) at a specific position. A position at which a mobile terminal can perform communication through a mobile communication network can be specified at a certain level of precision by collecting and analyzing data which is transmitted from a mobile terminal on which, for example, a GPS (Global Positioning System) function is mounted and to which position information is added. In addition, a technique which improves precision of specifying a position by means of a GPS is also proposed (see, for example, Patent Literature 1).

CITATION LIST

Patent Literature

Patent Literature 1: Japanese Patent Application Laid-Open No. 8-36041

SUMMARY OF THE INVENTION

Problem to be Solved by the Invention

However, at positions of poor visibility (for example, inside a room, at an underground or in a deep mountain) which are surrounded by obstacles which block radio waves, radio waves are not generally received from GPS satellites. In other words, at positions at which there higher needs of checking in advance whether or not a mobile terminal can perform communication through a mobile communication network, a GPS is highly likely not to sufficiently function. Hence, data to which position information which indicates a position of poor visibility is added can not be sufficiently obtained.

An object of the present invention is to specify a position at which a mobile terminal can perform communication through a mobile communication network without depending on a GPS.

Means for Solving the Problem

In order to solve the above problem, an aspect of an embodiment may provide an information processing apparatus comprising:

a first acquiring means that acquires an access history from a memory means that stores, per user, the access history of an access from a mobile terminal to a server apparatus through a mobile communication network;

a second acquiring means that acquires a use history from a memory means that stores, per user, the use history including a use period of time in which a service is to be used by a user and information which contributes to specifying a position of the user at the time when the user uses the service;

a specifying means that, when a time indicated by one access history associated with one user corresponds to one use period of time included in one use history associated with the one user, specifies a position specified based on the information which contributes to specifying the position included in the one use history, as a position at which the mobile terminal is present at the time of the access related to the one access history; and an outputting means that outputs position information which indicates the position specified by the specifying means and information which indicates a communication carrier which operates the mobile communication network through which the access related to the one access history is made in a manner in which the position information is associated with the information which indicates the communication carrier.

According to the present invention, it is possible to specify a position at which a mobile terminal can perform communication through a mobile communication network without depending on a GPS.

Another aspect of an embodiment may provide the information processing apparatus, further comprising:

a third acquiring means that acquires time data which indicates at least one of a start time and an end time at which the service is available; and a determining means that, based on the time data acquired by the third acquiring means, determines accuracy indicating that the mobile terminal is present at the position specified by the specifying means at the time of the access, wherein, when the accuracy determined by the determining means is a predetermined value or more, the outputting means associates and outputs the position information and the information which indicates the communication carrier.

According to the present invention, depending on whether or not accuracy that the mobile terminal is present at the specified position upon access is the predetermined value or more, whether or not to associate and output the position information and information which indicates the communication carrier can be controlled, so that it is possible to further increase reliability of the information to be outputted.

another aspect of an embodiment may provide the information processing apparatus, further comprising:

a fourth acquiring means that acquires evaluation data evaluated by the user as to the service used by the user of the mobile terminal; and a determining means that, based on the evaluation data acquired by the fourth acquiring means, determines accuracy indicating that the mobile terminal is present at the position specified by the specifying means at the time of the access, wherein, when the accuracy determined by the determining means is a predetermined value or more, the outputting means associates and outputs the position information and the information which indicates the communication carrier.

According to the present invention, depending on whether or not accuracy that the mobile terminal is present at the specified position upon access is the predetermined value or more, whether or not to associate and output the position information and information which indicates the communication carrier can be controlled, so that it is possible to further increase reliability of the information to be outputted.

Another aspect of an embodiment may provide the information processing device, further comprising:

a fifth acquiring means that acquires post data posted by the user as to the service used by the user of the mobile terminal; and a determining means that, based on the post data acquired by the fifth acquiring means, determines accuracy indicating that the mobile terminal is present at the position specified by the specifying means at the time of the access, wherein, when the accuracy determined by the determining means is a predetermined value or more, the outputting means associates and outputs the position information and the information which indicates the communication carrier.

According to the present invention, depending on whether or not accuracy that the mobile terminal is present at the specified position upon access is the predetermined value or more, whether or not to associate and output the position information and information which indicates the communication carrier can be controlled, so that it is possible to further increase reliability of the information to be outputted.

Another aspect of an embodiment may provide the information processing apparatus, further comprising:

a sixth acquiring means that acquires related data which is related data of post data posted by the user as to the service used by the user of the mobile terminal, and which contributes to determining a position of the user at the time of transmission of the post data and is acquired in relation to the post data; and a determining means that, based on the related data acquired by the sixth acquiring means, determines accuracy indicating that the mobile terminal is present at the position specified by the specifying means at the time of the access, wherein, when the accuracy determined by the determining means is a predetermined value or more, the outputting means associates and outputs the position information and the information which indicates the communication carrier.

According to the present invention, depending on whether or not accuracy that the mobile terminal is present at the specified position upon access is the predetermined value or more, whether or not to associate and output the position information and information which indicates the communication carrier can be controlled, so that it is possible to further increase reliability of the information to be outputted.

Another aspect of an embodiment may provide the information processing apparatus, further comprising:

at least two acquiring means of a third acquiring means that acquires time data which indicates at least one of a start time and an end time at which the service is available; a fourth acquiring means that acquires evaluation data evaluated by the user as to the service used by the user of the mobile terminal; a fifth acquiring means that acquires post data posted by the user as to the service used by the user of the mobile terminal; and a sixth acquiring means that acquires related data which is related data of post data posted by the user as to the service used by the user of the mobile terminal, and which contributes to determining a position at which the mobile terminal of source of transmission is present at the time of transmission of the post data and is acquired in relation to the post data; and a determining means that, based on at least two data of the time data acquired by the third acquiring means, the evaluation data acquired by the fourth acquiring means, the post data acquired by the fifth acquiring means and the related data acquired by the sixth acquiring means, determines accuracy that the mobile terminal is present at the position specified by the specifying means at the time of the access, wherein, when the accuracy determined by the determining means is a predetermined value or more, the outputting means associates and outputs the position information and the information which indicates the communication carrier.

According to the present invention, depending on whether or not accuracy that the mobile terminal is present at the specified position upon access is the predetermined value or more, whether or not to associate and output the position information and information which indicates the communication carrier can be controlled, so that it is possible to further increase reliability of the information to be outputted.

Another aspect of an embodiment may provide an information processing method executed by a computer comprising:

a first acquiring step of acquiring an access history from a memory means that stores, per user, the access history of an access from a mobile terminal to a server apparatus through a mobile communication network;

a second acquiring step of acquiring a use history from a memory means that stores, per user, the use history including a use period of time in which a service is to be used by a user and information which contributes to specifying a position of the user at the time when the user uses the service;

a specifying step of, when a time indicated by one access history associated with one user corresponds to one use period of time included in one use history associated with the one user, specifying a position specified based on the information which contributes to specifying the position included in the one use history, as a position at which the mobile terminal is present at the time of the access related to the one access history; and an outputting step of outputting position information which indicates the position specified by the specifying means and information which indicates a communication carrier which operates the mobile communication network through which the access related to the one access history is made in a manner in which the position information is associated with the information which indicates the communication carrier.

Another aspect of an embodiment may provide an information processing program causing a computer to function as:

a first acquiring means that acquires an access history from a memory means that stores, per user, the access history of an access from a mobile terminal to a server apparatus through a mobile communication network;

a second acquiring means that acquires a use history from a memory means that stores, per user, the use history including a use period of time in which a service is to be used by a user and information which contributes to specifying a position of the user at the time when the user uses the service;

a specifying means that, when a time indicated by one access history associated with one user corresponds to one use period of time included in one use history associated with the one user, specifies a position specified based on the information which contributes to specifying the position included in the one use history, as a position at which the mobile terminal is present at the time of the access related to the one access history; and an outputting means that outputs position information which indicates the position specified by the specifying means and information which indicates a communication carrier which operates the mobile communication network through which the access related to the one access history is made in a manner in which the position information is associated with the information which indicates the communication carrier.

Another aspect of an embodiment may provide a recording medium having an information processing program computer-readably recorded therein which causes a computer to function as:

a first acquiring means that acquires an access history from a memory means that stores, per user, the access history of an access from a mobile terminal to a server apparatus through a mobile communication network;

a second acquiring means that acquires a use history from a memory means that stores, per user, the use history including a use period of time in which a service is to be used by a user and information which contributes to specifying a position of the user at the time when the user uses the service;

a specifying means that, when a time indicated by one access history associated with one user corresponds to one use period of time included in one use history associated with the one user, specifies a position specified based on the information which contributes to specifying the position included in the one use history, as a position at which the mobile terminal is present at the time of the access related to the one access history; and an outputting means that outputs position information which indicates the position specified by the specifying means and information which indicates a communication carrier which operates the mobile communication network through which the access related to the one access history is made in a manner in which the position information is associated with the information which indicates the communication carrier.

Advantageous Effects of the Invention

According to the present invention, a mobile terminal can specify a position at which the mobile terminal can perform communication through a mobile communication network without depending on a GPS.

BRIEF DESCRIPTION OF THE DRAWINGS

FIG. 3A is a view illustrating a schematic configuration example of a position analysis processing server 8 according to the present embodiment. FIG. 3B is a view illustrating an example of a functional block of a system control unit 84.

FIG. 4A is a view illustrating an example of registered content in an access history database 821. FIG. 4B is a view illustrating an example of registered content in a service use history database 822. FIG. 4C is a view illustrating an example of registered content of a keyword associating database 823. FIG. 4D is a view illustrating an example of registered content in a post managing database 824. FIG. 4E is a view illustrating an example of registered content in a position managing database 825.

DESCRIPTION OF EMBODIMENTS

Hereinafter, an embodiment of the present invention will be described with reference to the drawings. The embodiment will be described where the present invention is applied to an information providing system.

[1. Outline of Configuration and Function of Information Providing System]

Figure 1:
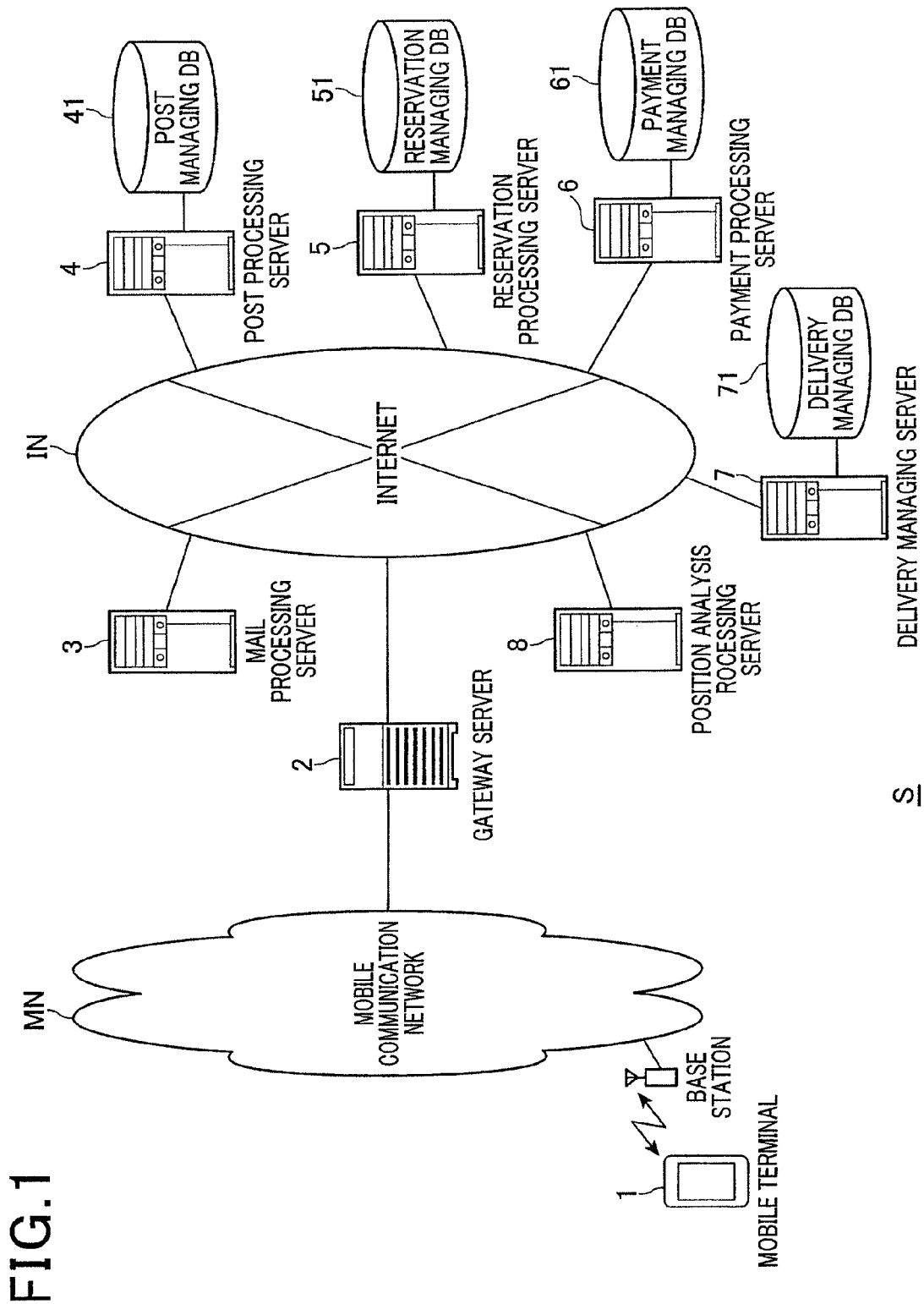
FIG. 1 is a view illustrating an example of a schematic configuration of an information providing system according to the present embodiment.

First, a configuration and a schematic function of an information providing system S according to an embodiment of the present invention will be described using FIG. 1. FIG. 1 is a view illustrating a schematic configuration example of the information providing system S according to the present embodiment. As illustrated in FIG. 1, the information providing system S has a mobile terminal 1, a gateway server 2, a mail processing server 3, a post processing server 4, a reservation processing server 5, a payment managing server 6, a delivery managing server 7, and a position analysis processing server 8. Although, in addition to these servers, there is an information providing server which provides information for which a browsing request is made as page data to the mobile terminal 1 or a personal computer in response to the browsing request from, for example, the mobile terminal 1 or the personal computer (not illustrated), the information providing server is not illustrated. At least one of the mail processing server 3, the post processing server 4, the reservation processing server 5, the payment server 6 and the delivery managing server 7 also has a function of the information providing server. In addition, in the information providing server which provides information for which a browsing request is made, a browsing history including a browsing date is associated with, for example, a user ID of a user of the mobile terminal 1 or the personal computer and stored. In addition, a "date" may include a year and a month (the same applies below). The user ID is information which allows a user to be identified. Further, a user ID can be acquired from a Cookie upon log in of a user and stored in the personal computer. Furthermore, when the user of the mobile terminal 1 or the personal computer logs in, the information providing server associates and stores a log-in history including a log-in date and, for example, a user ID of the user of the mobile terminal 1 or the personal computer.

The mobile terminal 1 is a mobile communication apparatus such as a mobile telephone, a smartphone or a mobile game machine which has a communication function. The mobile terminal 1 can connect to a mobile communication network MN through a base station in a range of the mobile communication network (carrier network) MN in which radio waves from a base station reaches, and connect to Internet IN through the mobile communication network MN. The mobile communication network MN is a network which has a 3G communication line constructed and operated by a communication carrier. Further, in case of the mobile terminal 1 which has a wireless LAN function, the mobile terminal 1 can also perform wireless communication with a mobile router (also referred to "mobile Wi-Fi (registered trademark)" below) by a wireless LAN function, connect to the mobile communication network MN through the mobile router and connect to the Internet IN through the mobile communication network MN. In this case, the mobile router connects to the mobile communication network MN through a base station. The mobile router is, for example, carried together with the mobile terminal 1 by the user of the mobile terminal 1. In addition, although one mobile terminal 1 is illustrated in the example in FIG. 1, there is actually a mobile terminal per user. Although one mobile communication network MN, there is actually a mobile communication network per communication carrier.

The gateway server 2 is a server which is connected to the mobile communication network MN and the Internet IN, and relays various items of data (including electronic mails) to and from the mobile communication network MN and the Internet IN. While various items of data (including electronic mails) are transmitted and received according to, for example, HTTP (Hypertext Transfer Protocol) or SMTP (Simple Mail Transfer Protocol) on the Internet IN side, data is transmitted and received according to a communication protocol matching a communication carrier on the mobile communication network MN side. Hence, the gateway server 2 performs processing of converting protocol upon data relay. For example, an access from the browser of the mobile terminal 1 to a web site on the Internet IN or a SMTP server is made through the mobile communication network MN and the gateway server 2. The gateway server 2 is constructed and operated per, for example, communication carrier.

The mail processing server 3 is, for example, a server which is connected to, for example, the Internet IN, and performs processing of transmitting and receiving electronic mails transmitted from the mobile terminal 1 or the personal computer. The mail processing server 3 is, for example, a webmail server, a SMTP server and a POP3 server. In the mail processing server 3, an electronic mail transmission/reception history which includes at least reception dates of electronic mails transmitted from the mobile terminal 1 or the personal computer is associated with, for example, a user ID or an electronic mail address of the mobile terminal 1 or the personal computer and is stored. The electronic mail address is also information which allows the user to be identified. Further, in case of the webmail server, the user is required to log in to browse web mails. When the user of the mobile terminal 1 or the personal computer logs in, a log-in history including a log-in date is associated with, for example, a user ID of the user of the mobile terminal 1 or the personal computer, and is stored in the webmail server. In addition, although the mail processing server 3 is an example of the server connected to the Internet IN in the present embodiment, the mail processing server may be a mobile mail server connected to the mobile communication network MN.

The post processing server 4 is, for example, a server which is connected to the Internet IN, and which operates a web site for registering and releasing post data from the mobile terminal 1 or the personal computer. This web site is, for example, a blog site, a SNS (Social Networking Service) site (community site), a mini blog site (for example, a twitter (TWITTER (registered trademark)) site) and a word-of-mouth site. In addition, the web site is, for example, a shopping site which also registers and releases post data, an auction site, a trip reservation site, a transportation means use reservation site, a facility accommodate reservation site and a facility use reservation site. The post processing server 4 is, for example, installed per site. The post processing server 4 may be configured by one server which has a web server function, or by a plurality of servers functions of which are divided into, for example, a web server, an application server and a database server. In addition, although the post processing server 4 is an example of the server connected to the Internet IN in the present embodiment, the post processing server may be a server connected to the mobile communication network MN.

When receiving post data transmitted from the mobile terminal 1 or the personal computer, the post processing server 4 registers the post data in the post managing database (DB) 41. The post data includes, for example, a post date (a transmission date of post data) and content of a post. The content of the post indicates, for example, an entry of a blog, a tweet, a comment in an SNS (message) and a word of mouth. The content of the post includes a keyword a specific spot (location) in some cases. Further, the post data is on service used by the user. In this case, the post data includes information which allows a facility, a store or a transportation means related to the service to be identified. Further, the post data also includes evaluation data (for example, a review) evaluated by the user as to service used by the user.

Figure 2B:
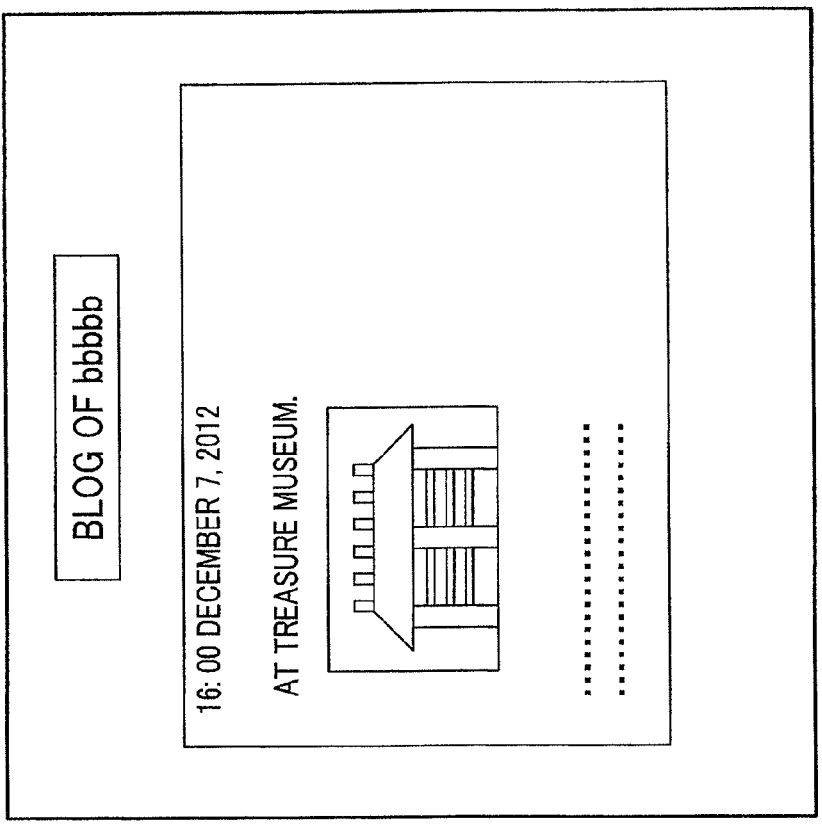
FIGS. 2A and 2B are views illustrating examples of a display screen of displayed post data which is acquired from a blog site through a browser of a mobile terminal 1.
Figure 2A:
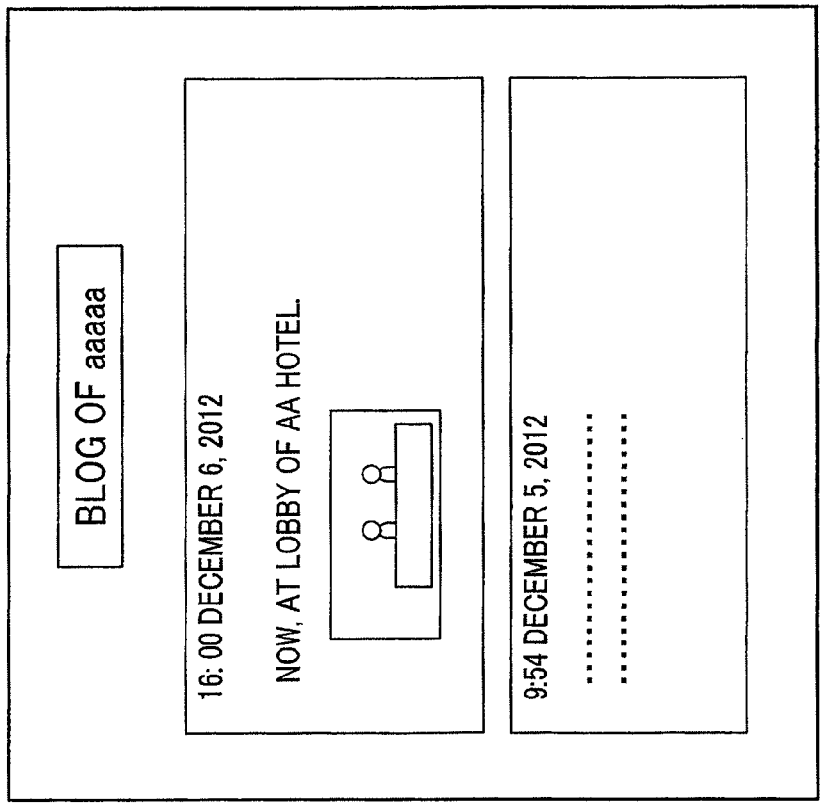

FIGS. 2A and 2B are views illustrating examples of a display screen of displayed post data which is acquired from a blog site through the browser of the mobile terminal 1. For example, "AA hotel" and "lobby" included in post data displayed in FIG. 2A, and "treasure museum" included in post data displayed in FIG. 2B correspond to keywords which indicate spots. In the present embodiment, position information corresponding to a position of a spot is specified using a keyword which is included in post data and indicates a spot.

Further, although post data is, for example, included in a body of a HTTP request and received by the post processing server 4, a header of the HTTP request received through the mobile communication network MN and the gateway server 2 generally includes a user agent (UA). This user agent includes a character string indicating at least one of a communication carrier name or a model name of the mobile terminal 1. In this case, the user agent (including a character string indicating at least one of the communication carrier name and the model name of the mobile terminal 1) in the HTTP request for transmitting the post data, and the post data are associated and registered in the post managing database 41. In addition, a transmission source IP address of post data received by the post processing server 4 may be associated with the post data, and registered in the post managing database 41. The transmission source IP address in this case is, for example, an IP address of the gateway server 2 which relays post data.

Further, in case of a web site which requires log-in at the time of registration of post data, the user ID of the user of the mobile terminal 1 or the personal computer which transmits the post data and the post data are associated and registered in the post managing database 41. When the user of the mobile terminal 1 or the personal computer logs in, a log-in history including a log-in date is associated with, for example, a user ID of the user of the mobile terminal 1 or the personal computer, and is stored in the post processing server 4. This user ID is included in, for example, post data (alternatively, post data is added). Further, post data includes identification information including a Cookie ID corresponding to a user ID (alternatively, added to post data) instead of the user ID in some cases. In this case, identification information such as a Cookie ID as information which allows the user to be identified may be associated with the post data, and registered in the post managing database 41. Further, post data transmitted from the mobile terminal 1 or the personal computer is attached image data (picture data) in some cases. In this case, the image data added to post data, and the post data are associated and registered in the post managing database 41. An image capturing date can be acquired from image data in some cases. Further, in case of, for example, the mobile terminal 1 which has a camera function and a GPS function, position information which indicates a latitude and a longitude detected by the GPS function is added (added as a geotag) is added to the image data captured by the camera function. In this case, the image data to which the position information is added and post data are associated and registered in the post managing database 41. In addition, the position information to which the image data is added is position information which indicates an image capturing spot. Alternatively, position information which indicates the latitude and the longitude detected by the GPS function is added to post data. In this case, the position information which is added to post data and indicates the latitude and the longitude, and the post data are associated and registered in the post managing database 41. In addition, the position information to which the post data is position information which indicates a transmission spot of post data.

The reservation processing server 5 is, for example, a server which is connected to the Internet IN, and which operates a web site for registering a reservation for using service according to a service use reservation request from the mobile terminal 1 or the personal computer. This service corresponds to corresponds to transportation means use service, facility accommodation service and facility use service. Further, a web site is, for example, a trip reservation site, a transportation means use reservation site, a facility accommodation reservation site and a facility use reservation site. Meanwhile, the transportation means corresponds to, for example, an airplane, a ship and a high-way bus. Further, the facility corresponds to, for example, a hotel, an inn, a restaurant, a Japanese restaurant, a concert hall, a theater, an event site, a golf course, a golf practice range, a hair salon, a museum and a movie theater. In addition, these facilities are examples, and are not limited thereto. The reservation processing server 5 is, for example, installed per site. The reservation processing server 5 may be configured by one server which has a web server function, or by a plurality of servers functions of which are divided into, for example, a web server, an application server and a database server. In addition, although the reservation processing server 5 is an example of the server connected to the Internet IN in the present embodiment, the reservation processing server may be a server connected to the mobile communication network MN.

When receiving a service use reservation request and reservation data which is necessary for reservation from the mobile terminal 1 or the personal computer after the user logs in, the reservation processing server 5 associates and registers the reservation data and the user ID of the user who made the reservation in the reservation managing database (DB) 51. Further, when the user of the mobile terminal 1 or the personal computer logs in, a log-in history including a log-in date and, for example, a user ID of the user of the mobile terminal 1 or the personal computer are associated and stored in the reservation processing server 5. In case of the transportation means use service, reservation data includes, for example, a service use period (for example, a scheduled departure date and a scheduled arrival date) of the transportation means) of the service, information such as a use site of the service and information (an ID or a name (such as a flight number)) which allows the transportation means related to the service to be identified. Meanwhile, information of a use site of transportation means use service corresponds to, for example, "an address of a departure site by means of a transportation means" and "position information which indicates a latitude and a longitude of the departure site by means of the transportation means". Further, information of a use site of transportation means use service corresponds to, for example, "an address of an arrival site by means of a transportation means" and "position information which indicates a latitude and a longitude of the arrival site by means of the transportation means". Furthermore, in case of accommodation service or use service of a facility, reservation data includes information such as a use period of this service (such as a scheduled use date or an scheduled accommodation date), a use site of this service and the number of users or the number of people who stay, and information (an ID or a name) which allows a facility related to this service to be identified. Meanwhile, information of a use site of accommodation service or use service of a facility corresponds to, for example, "a facility address" and "position information which indicates the latitude and the longitude of the facility". Further, when the user pays the fee for use reservation, payment information of this fee is registered in the reservation managing database 51. Furthermore, when the user cancels user reservation, information of this cancellation is registered in the reservation managing database 51. The information registered in the reservation managing database 51 configures a user's reservation history of service use reservation.

The payment managing server 6 is, for example, a server which is connected to the Internet IN, and which manages payment data related to credit card payment or electronic money payment placed at an affiliated store which provides payment service by a credit card or electronic money. An affiliated store is, for example, a store which actually exists in a department store or a shopping mall. At the affiliated store, a payment processing terminal of performing processing of credit card payment or electronic money payment is installed. The payment processing terminal is connected to, for example, the payment managing server 6 through the Internet IN. When receiving payment data transmitted from the payment processing server, the payment managing server 6 registers the payment data in the payment managing database 61. The payment data includes, for example, information such as a use period of payment service (for example, a payment date) and a use site of this payment service, and information (an ID or a name) which allows a store (affiliated store) related to this service to be identified. Meanwhile, information of a use site of payment service corresponds to, for example, "a store address" and "position information which indicates the latitude and the longitude of the store". The information registered in the payment managing database 61 configures a credit card payment history or an electronic money payment history. In addition, although the payment processing server 6 is an example of the server connected to the Internet IN in the present embodiment, the payment processing server may be a server connected to the mobile communication network MN.

The delivery managing server 7 is, for example, a server which is connected to the Internet IN, and which manages delivery data related to delivery service of a home delivery person or a deliveryman. A delivery target object corresponds to, for example, a product purchased at a shopping site or an auction site, and beverage ordered for delivery. When receiving delivery data transmitted from a terminal of a home delivery person or a deliveryman, the delivery managing server 7 registers the delivery data in the delivery managing database 71. In addition, the delivery managing server 7 may be configured as part of a server which operates a web site such as a shopping site or an auction site. In this case, when receiving delivery data from a product transaction processing server at a shopping site or an auction site, the delivery data is registered in the delivery managing database 71. The delivery data includes, for example, information such as a use period of delivery service and a delivery destination of the delivery service. Meanwhile, the delivery service use period corresponds to, for example, "a scheduled delivery date" and "a delivery completed date" by a home delivery person and a deliveryman. Further, information of the delivery destination corresponds to, for example, "a delivery destination address" and "position information which indicates the latitude and the longitude of the delivery destination". Information registered in the delivery managing server 71 configures a delivery history. In addition, although the delivery managing server 7 is an example of the server connected to the Internet IN in the present embodiment, the delivery managing server may be a server connected to the mobile communication network MN.

The position analysis processing server 8 is an example of an information processing apparatus according to the present invention, and is connected to, for example, the Internet IN. In addition, the position analysis processing server 8 may be mounted as one of servers which operate the above web site. In addition, although the position analysis processing server 8 is an example of the server connected to the Internet IN in the present embodiment, the position analysis processing server may be a server connected to the mobile communication network MN.

FIG. 3A is a view illustrating a schematic configuration example of the position analysis processing server 8 according to the present embodiment. As illustrated in FIG. 3A, the position analysis processing server 8 has a communication unit 81, a memory unit 82 (an example of a memory means), an input/output interface unit 83 and a system control unit 84. Further, the system control unit 84 and the input/output interface unit 83 are connected through a system bus 85. The communication unit 81 is connected to the Internet IN, and controls a communication state.

The memory unit 82 is formed with, for example, a hard disk drive, and stores various programs such as an operating system and a position analysis processing program (including an information processing program according to the present invention). In addition, the position analysis processing program may be, for example, downloaded from a predetermined server through the Internet IN, or recorded in and read from a recording medium such as a CD (Compact Disc) and a DVD (Digital Versatile Disc).

Further, in the memory unit 82, an access history database (DB) 821, a service use history database (DB) 822, a keyword associating database (DB) 823, a post managing database (DB) 824 and a position managing database (DB) 825 are provided. In addition, these databases may be provided in another server different from the position analysis processing server 8 instead of being provided in the memory unit 82.

In the access history database 821, an access history of an access from the mobile terminal 1 or the personal computer to a server apparatus is registered per user. Meanwhile, the server apparatus corresponds to, for example, a server (including an information providing server) which is connected to the mail processing server 3, the post processing server 4 and the reservation processing server 5, and, in addition, to the mobile communication network MN or the Internet IN, and which the mobile terminal 1 or the personal computer can access. The access history is acquired from this server apparatus at a predetermined timing. In addition, the access history may be any history as long as the history allows the access from the mobile terminal 1 or the personal computer to the sever apparatus to be specified. This access history corresponds to, for example, the above log-in history, an electronic mail transmission/reception history and a browsing history. Further, a request transmitted from the mobile terminal 1 through the mobile communication network MN upon an access related to the access history is converted into a HTTP request by the gateway server 2 and is received by the server apparatus. In this case, a header of the HTTP request generally includes a user agent. This user agent includes a character string indicating at least one of a communication carrier name or a model name of the mobile terminal 1. This user agent included in the above access history is acquired, and is registered in the access history database 821. In addition, a transmission source IP address of the request transmitted from the mobile terminal 1 through the mobile communication network MN upon an access related to the access history and included in the access history may be acquired, and registered in the access history database 821. The transmission source IP address in this case is, for example, an IP address of the gateway server 2 at which the above request is relayed. FIG. 4A is a view illustrating an example of registered content in the access history database 821. In the access history database 821 illustrated in FIG. 4A, information such as various dates such as a log-in date, a type and a user ID (an electronic mail address is also possible) are associated and registered. Thus, in the access history database 821, an access history to various apparatuses is collected. In addition, an access history used for position analysis processing described below among access histories registered in the access history database 821 is associated with a processed flag and is registered.

In the service use history database 822, a use history (referred to as a "service use history" below) including a use period of service used by the user and information which contributes to specifying a position of the user upon use is registered per use. A service use history registered in the access history database 821 corresponds to, for example, the above reservation history, electronic money payment history and delivery history. Further, the service use history includes information which allows a facility, a store or a transportation means related to service to be identified in some cases. Furthermore, information (referred to as "user position specifying information" below) which contributes to specifying the position of the user upon use corresponds to the above "information of a use site of use service by means of the transportation means", "information of a use site of facility accommodation service", "information of a use site of facility use service", "information of a use site of payment service" and "information of a delivery destination of delivery service". In addition, the user position specifying information may not be necessarily position information which indicates an address, and an latitude and a longitude, and may be information which serves as a keyword which allows position information which indicates the address, and the latitude and the longitude to be searched and which allows a facility, a store or a transportation means related to service to be identified. FIG. 4B is a view illustrating an example of registered content in the service use history database 822. In the service use history database 822 illustrated in FIG. 4B, a use period of service, a use site of service (an example of user position specifying information) and information such as a user ID are associated and registered. The service use history registered in the service use history database 822 and, for example, the user ID are acquired at a predetermined timing from at least one of the reservation processing server 5, the payment managing server 6 and the delivery managing server 7. Thus, in the service use history database 822, various service use histories are collected.

In the keyword associating database 823, a keyword which indicates a predetermined spot and position information which corresponds to a position of a spot are associated and registered. The keyword which indicates a predetermined spot and position information which corresponds to the position of the spot are registered in advance by, for example, a system administrator. FIG. 4C is a view illustrating an example of registered content of the keyword associating database 823. In a record 1 of the keyword associating database 823 illustrated in FIG. 4C, "AA hotel, 3 minute walk from xx station, lobby" which are keywords indicating a spot and "1-2, ◯◯ ward, Nagoya city, AA hotel, first floor" which is position information corresponding to the position of the spot are associated and registered. Although the spot position is specified based on an address, a facility name and a floor name (floor) in this example, the latitude and the longitude may be used instead of the address. The floor number is information indicating an altitude (height). By this means, in this example, position information defines a spot spatial position ((latitude, longitude, altitude) or (address+floor number)).

In the post managing database 824, post data is registered. FIG. 4D is a view illustrating an example of registered content in the post managing database 824. Post data registered in the post managing database 824 is, for example, acquired at a predetermined timing from the post managing database 41 of the post processing server 4 of each web site. Thus, in the post managing database 824, post data posted in various web sites such as blog sites, SNS sites and mini blog sites are collected. In addition, information such as a user ID registered in association with post data in the above post managing database 824, and post data are acquired, and registered in the post managing database 824 as illustrated in FIG. 4D.

In the position managing database 825, position information (referred to as "terminal presence position information" below) which indicates a position at which the mobile terminal 1 present upon an access related to the access history, and information (referred to as "communication carrier information" below) which indicates a communication carrier which operates the mobile communication network MN through which an access related to the access history is made are associated and registered. A position at which the mobile terminal 1 is present upon the access related to the access history is specified using the access history and the service use history as described below. FIG. 4E is a view illustrating an example of registered content in the position managing database 825. In the position managing database 825 illustrated in FIG. 4E, terminal presence position information and communication carrier information are associated with the user ID of the user of the mobile terminal 1 and registered.

The system control unit 84 is formed with a CPU (Central Processing Unit) 84*a*, a ROM (Read Only Memory) 84*b* and a RAM (Random Access Memory) 84*c*. FIG. 3B is a view illustrating an example of a functional block of the system control unit 84. The system control unit 84 as a computer executes position analysis processing according to a position analysis processing program stored in the memory unit 82. According to this processing, as illustrated in FIG. 3B, the system control unit 84 functions as an access history acquiring unit 841, a service use history acquiring unit 842, a terminal presence position specifying unit 843, a presence accuracy determination data acquiring unit 844, a terminal presence accuracy determining unit 845 and a position information outputting unit 846. In addition, the access history acquiring unit 841 is an example of a first acquiring means according to the present invention. The service use history acquiring unit 842 is an example of a second acquiring means according to the present invention. The terminal presence specifying unit 843 is an example of a specifying means according to the present invention. The presence accuracy determining data acquiring unit 844 is an example of a third acquiring means to a sixth acquiring means according to the present invention. The terminal presence accuracy determining unit 845 is an example of a determining means according to the present invention. The position information outputting unit 846 is an example of an outputting means according to the present invention.

The access history acquiring unit 841 acquires from the access history database 821 an access history of an access from the mobile terminal 1 to the server apparatus through the mobile communication network MN. The access history acquired by the access history acquiring unit 841 also includes an access history of an access from the mobile terminal 1 to the server apparatus through the mobile communication network MN. In addition, the access history acquired by the access history acquiring unit 841 does not include, for example, an access history of an access from the personal computer to the server apparatus through the mobile communication network MN.

The service use history acquiring unit 842 acquires from the service use history database 822 a service use history including a use period of service used by the user and user position specifying information.

When a time (for example, a date) indicated by one access history associated with one user corresponds to a use period included in one service use history associated with the user, the terminal presence position specifying unit 843 specifies a position specified based on user position specifying information included in the use history, as a position at which the mobile terminal 1 is present upon an access related to the access history. Meanwhile, a phrase "associated with the user" means association with information (for example, a user ID or an electronic mail address) which allows the user to be identified. "One access history" and "one service use history" are histories of a single user. "The time indicated by the access history" (referred to as an "access time" below) corresponds to, for example, a browsing date, a log-in date, and a reception date of an electronic mail. That "when the access time corresponds to a use period included in a service use history" corresponds to, for example, "when an access time is within a past predetermined time (for example, five minutes) from a departure date of a transportation means", "when an access time is within a predetermined time range (for example, ten minutes) including a payment date" and "when an access time is included in a facility accommodate date". When determining that an access time from the mobile terminal 1 of the user to the server apparatus is closer to a use period of service used by the user to a certain degree or more, the terminal presence position specifying unit 843 specifies a user position upon use of the service as a position at which the mobile terminal 1 is present upon the access, in other words, the position at which the mobile terminal is assumed to be present. The position specified in this way can be referred to as a position at which the mobile terminal 1 can perform communication through the mobile communication network MN. Further, in the present embodiment, to improve accuracy that the mobile terminal 1 is present upon an access, the presence accuracy determination data acquiring unit 844 and the terminal presence accuracy determining unit 845 are provided at the position specified in this way.

The presence accuracy determination data acquiring unit 844 acquires presence accuracy determination data which the terminal presence determining unit 845 uses to determine the above accuracy. The presence accuracy determination data corresponds to, for example, time data which indicates at least one of a start time and an end time at which service is available, evaluation data evaluated by the user as to service, post data posted by the user as to service, and related data of post data posted by the user as to service.

Meanwhile, the time data indicates, for example, a front business hour of a facility (the start time and the end time), a curfew (corresponding to the end time) or a meal time (the start time and the end time). This time data is acquired from a predetermined site such as a trip reservation site or an accommodate reservation site using information which allows the facility to be identified as a key. Further, the time data indicates, for example, a store business hour (the start time and the closing time). This time data is acquired from a predetermined site such as a site provided by the store using information which allows the facility to be identified as a key. Further, the time data indicates a departure time and an arrival time of the transportation means and a business hour of the transportation means (the start time and the end time). This time data is acquired from a predetermined site such as a use reservation site of a transportation means using information which allows the facility to be identified as a key. Further, post data, evaluation data and related data made by the user as to service are acquired from, for example, the post managing database 522 together with the user ID of the user using "information which allows the user to be identified" and "information which allows a facility, a store and a transportation means to be identified" as keys. The related data is data which contributes to determining the position of the user upon transmission of the post data, and which is acquired in relation to the post data. The related data corresponds to, for example, "image data added to post data", "position information added to post data", "a word or a phrase expressed assuming that a poster is at a spot which is a position corresponding to position information" and "a word or a phrase expressed assuming that the poster is not at a spot which is the position corresponding to position information".

The terminal presence accuracy determining unit 845 determines accuracy that a mobile terminal is present at the position specified by the terminal presence position specifying unit 843 upon an access, based on the presence accuracy determination data acquired by the presence accuracy determination data acquiring unit 844. Meanwhile, the accuracy is represented by, for example, a numerical value, and, when the accuracy is higher, the mobile terminal 1 is highly likely to be present upon an access. Further, what is more effective is that the terminal presence accuracy determining unit 845 determines accuracy that a mobile terminal is present at the position specified by the terminal presence position specifying unit 843 upon an access, based on at least two of time data, evaluation data, post data and related data (that is, at least two types of presence accuracy determination data) acquired by the presence accuracy determination data acquiring unit 844. In addition, details of a method of determining accuracy at the terminal presence accuracy determining unit 845 will be described below.

The position information outputting unit 846 associates and outputs terminal presence position information which indicates the position specified by the terminal presence position specifying unit 843, and communication carrier information which indicates a communication carrier which operates the mobile communication network MN through which an access related to an access history acquired by the access history acquiring unit 841 is made. In addition, when the accuracy determined by the terminal presence accuracy determining unit 845 is a predetermined value or more, the position information outputting unit 846 preferably associates and outputs the terminal presence position information and the communication carrier, so that it is possible to improve the accuracy that the mobile terminal 1 is present upon an access. An output destination of terminal presence position information from the position information outputting unit 846 is, for example, the position managing database 825, other servers, a terminal of an administrator or a portable memory medium. In addition, the information outputted from the position information outputting unit 846 is configured to include an access history and a service use history which the terminal presence position specifying unit 843 uses to specify the position, or may be configured to include a user ID associated with these histories.

[2. Operation of Information Providing System S]

Figure 5:
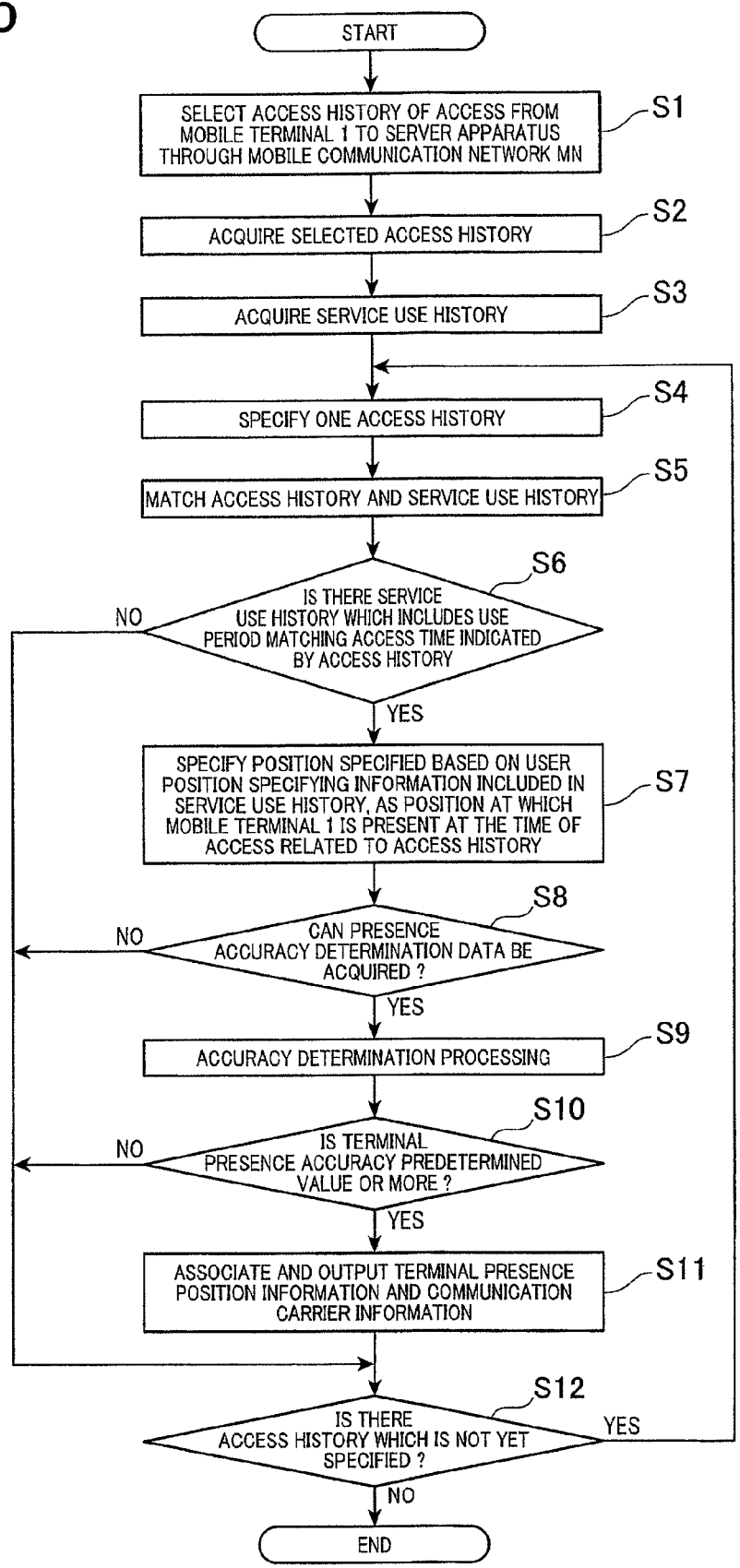
FIG. 5 is a flowchart illustrating position analysis processing in the system control unit 84 of the position analysis processing server 8.

Next, an operation of the information providing system according to the present embodiment will be described using FIG. 5. FIG. 5 is a flowchart illustrating position analysis processing in the system control unit 84 of the position analysis processing server 8. In addition, the operation described below assumes that an access history acquired from the server apparatus is registered in the access history database 821. The service use histories acquired from at least one of the reservation processing server 5, the payment managing server 6 and the delivery managing server 7 are registered in the service use history database 822. Further, in the post managing database 824, post data acquired from the post managing database 41 of the post processing server 4 is registered.

The processing illustrated in FIG. 5 is executed at, for example, a time interval set in advance (for example, every 24 hour). When the processing illustrated in FIG. 5 is started, the access history acquiring unit 841 selects an access history of an access from the mobile terminal 1 to the server apparatus through the mobile communication network MN from the access histories which are registered in the access history database 821 and which are not associated with a processed flag (step S1). For example, the access history acquiring unit 841 selects the access history based on the user agent (a character string indicating a communication carrier) or a transmission source IP address included in the access history.

Meanwhile, when the mobile terminal 1 accesses the server apparatus through the mobile communication network MN by means of the mobile router, a user agent is not included in the header of the request, and therefore it is difficult to select the access history based on the user agent. Alternatively, even when the user agent is included in the header of the request, a communication carrier cannot be specified from information in the user agent, and therefore it is assumed that selecting post data transmitted from the mobile terminal 1 as a transmission source through the mobile communication network MN is difficult. Hence, in this case, selecting the access history based on a transmission source IP address included in an access history is more preferable. When a communication carrier can be specified from a network portion of a transmission source IP address (indicating the network to which a host belongs), the post data can be selected based on the transmission source IP address. In this case, for example, in the network portion of the transmission source IP address, the mobile communication network MN is indicated as a network to which the gateway server 2 which relays post data belongs, so that it is possible to select the post data. Further, when post data is relayed through the mobile communication network MN, the transmission source IP address is, for example, an IP address of the gateway server 2. Hence, by storing an IP address list of the gateway server 2 in advance in the memory unit 82, the access history acquiring unit 841 can select the post data based on the transmission source IP address referring to the list.

In addition, the access history acquiring unit 841 may be configured to, when acquiring an access history from the server apparatus, select an access history of an access from the mobile terminal 1 to the server apparatus through the mobile communication network MN, and register the access history in the access history database 821. In this case, it is not necessary select an access history in step S1.

Next, the access history acquiring unit 841 acquires the access history selected in step S1 from the access history database 821 (step S2). By this means, for example, a plurality of access histories is acquired. Next, the service use history acquiring unit 842 acquires from the service use history database 822 a service use history including a use period of service used by the user and user position specifying information (step S3). By this means, for example, a plurality of service use histories is acquired.

Next, the terminal presence position specifying unit 843 specifies one access history from the access histories acquired in step S2 (step S4). Next, the terminal presence position specifying unit 843 matches the access history specified in step S4 and the service use history acquired in step S3 (step S5). Upon this matching, for example, the terminal presence position specifying unit 843 first searches a service use history matching the user ID and included in (that is, associated with) the user ID from the service use histories acquired in step S3 using a user ID included in (that is, associated with) the access history specified in step S4 as a key. Meanwhile, instead of using a user ID as a key, information which allows the user to be identified and which is associated with both of the access history and the service use history may be used as a key. Further, for example, while an electric mail address of the user is associated with the access history, the user ID of the user is associated with the service use history. In this case, in case of the user information database in which the user ID and the electronic mail address of the user are associated, a service use history matching the access history specified in step S4 may be configured to be searched by referring to this user information database. Further, when the service use history is found by this search, the terminal presence position specifying unit 843 searches a service use history including a user period (for example, a use period a date of which includes an access time and is an accommodation day) corresponding to an access time indicated by the access history specified in step S4 from the found service use history.

Next, as a result of matching in step S5, the terminal presence position specifying unit 843 determines whether or not a service use history is associated with the same user as one user associated with the access history specified in step S4 and includes a use period corresponding to an access time indicated by the access history (step S6). Further, when determining that there is a service use history including the user period corresponding to the access time (step S6: YES), the terminal presence position specifying unit 843 specifies the service use history and proceeds to step S7. Meanwhile, when determining that there is not a service use history including the use period corresponding to the access time (step S6: NO), the terminal presence position specifying unit 843 proceeds to step S12.

In step S7, the terminal presence position specifying unit 843 specifies a position specified based on user position specifying information included in the service use history specified in step S6 as the position at which the mobile terminal 1 is present upon an access related to the access history specified in step S4. The terminal presence position information which indicates the position specified in this way and the communication carrier information are temporarily held. Further, the access history specified in step S4 is associated with the processed flag and registered in the access history database 821.

Next, the presence accuracy determination data acquiring unit 844 searches presence accuracy determination data based on information included in the service use history specified in step S6, and determines whether or not the presence accuracy determination data can be acquired by the search (step S8). Further, when determining that the presence accuracy determination data cannot be acquired by the search (step S8: NO), the presence accuracy determination data acquiring unit 844 proceeds to step S12. Alternatively, the presence accuracy determination data acquiring unit may proceed to step S11 in this case. Meanwhile, when determining that the presence accuracy determination data can be acquired by the search (step S8: YES), the presence accuracy determination data acquiring unit 844 proceeds to step S9. Using, for example, "information which allows a facility, a store or a transportation means to be specified" and which is included in the service use history specified in step S6 as a key, time data which indicates at least one of a start time and an end time at which the service is available is acquired from a predetermined site as described above. Further, using "information which allows a facility, a store or a transportation means to be identified" and which is included in the service use history specified in step S6 and information which allows the user associated with the service use history as keys, presence accuracy determination data which is at least one of post data posted by the user as to the service, evaluation data evaluated by the user as to the service and related data of the post data is acquired from the predetermined site as described above.

In step S9, the terminal presence accuracy determining unit 845 performs accuracy determination processing of determining accuracy (referred to as "terminal presence accuracy" below) that the mobile terminal is present at the position specified in step S7 upon an access, based on the presence accuracy determination data acquire in step S8. A specific example of this determination processing will be described.

(a) Accuracy Determination Processing Based on Time Data

When, for example, time data which indicates a front desk business hour or a meal time of a facility is acquired, the terminal presence accuracy determining unit 845 determines whether or not the access time indicated by the access history specified in step S4 is included between a start time and an end time indicated by the time data. Further, when determining that the access time is included between the start time and the end time, the terminal presence accuracy determining unit 845 determines the terminal presence accuracy as, for example, "1". This is because, when the access time of an access from the mobile terminal 1 to the server apparatus through the mobile communication network MN is included between the start time and the end time of the front desk, the user of the mobile terminal 1 is highly likely to be present at the facility. Meanwhile, when determining that the access time is included between the start time and the end time, the terminal presence accuracy determining unit 845 determines the terminal presence accuracy as, for example, "0". In this case, the user of the mobile terminal 1 is also likely to be outside the facility. In addition, the same applies when the time data which indicates a store business hour is acquired. When time data which indicates a departure time of a transportation means is acquired, the terminal presence accuracy determining unit 845 determines whether or not the access time indicated by the access history specified in step S4 comes a predetermined time (for example, several minutes) after the departure time indicated by the time data. Further, when determining that the access time does not come a predetermined time after the departure time, the terminal presence accuracy determining unit 845 determines the terminal presence accuracy as, for example, "1". Meanwhile, when determining that the access time does not come a predetermined time after the departure time, the terminal presence accuracy determining unit 845 determines the terminal presence accuracy as, for example, "0".

(b) Accuracy Determination Processing Based on Post Data

When, for example, post data posted by the user is acquired, the terminal presence accuracy determining unit 845 determines whether or not the acquired post data is post data transmitted from the mobile terminal 1 as a transmission source through the mobile communication network MN. Based on, for example, a user agent (a character string indicating a communication carrier) or a transmission source IP address associated with the post data registered in the post managing database 824, the terminal presence accuracy determining unit 845 determines whether or not the acquired post data is post data transmitted from the mobile terminal 1 as a transmission source through the mobile communication network MN. Meanwhile, when post data transmitted through the mobile communication network MN by means of the mobile router, a user agent is not included in the header of the request, and therefore it is difficult to select the access history based on the user agent. Alternatively, even when the user agent is included in the header of the request, a communication carrier cannot be specified from information in the user agent, and therefore it is assumed that selecting post data transmitted from the mobile terminal 1 as a transmission source through the mobile communication network MN is difficult. Hence, in such a case, for example, the post data is more preferably selected based on the transmission source IP address associated with the post data. When a communication carrier can be specified from a network portion of a transmission source IP address (indicating the network to which a host belongs), the post data can be selected based on the transmission source IP address. In this case, for example, in the network portion of the transmission source IP address, the mobile communication network MN is indicated as a network to which the gateway server 2 which relays post data belongs, so that it is possible to select the post data. Further, when post data is relayed through the mobile communication network MN, the transmission source IP address is, for example, an IP address of the gateway server 2. Hence, by storing an IP address list of the gateway server 2 in advance in the memory unit 82, the terminal presence accuracy determining unit 845 can select the post data based on the transmission source IP address referring to the list.

Further, when determining that the acquired post data is post data transmitted from the mobile terminal 1 as a transmission source through the mobile communication network MN, the mobile presence accuracy determining unit 845 acquires position information associated with a keyword included in the acquired post data from, for example, the keyword associating database 823. For example, it is assumed that "AA hotel" and "lobby" are included in the specified post data, and the keyword associating database 823 illustrated in FIG. 4C is referred to. In this case, keywords such as "AA hotel" and "lobby" are extracted from the specified post data according to, for example, morphological analysis, and position information (position information corresponding to a spot position) which is "AA hotel, first floor, 1-2, ○○ ward, Nagoya city" associated with keywords matching the keywords (a combination of keywords) of extracted "AA hotel" and "lobby" is acquired from the keyword associating database 823 illustrated in FIG. 4C.

Further, the terminal presence accuracy determining unit 845 determines whether or not a predetermined condition to determine that the position specified based on the user position specifying information included in the service use history specified in step S6 and the position indicated by the position information associated with the keywords are near is satisfied. This predetermined condition corresponds to, for example, a condition that a position (for example, a planar position specified by the address or the latitude and the longitude) specified by the user position specifying information and a position (for example, a planar position specified by the address, or the latitude and the longitude) indicated by the position information associated with the keywords. Alternatively, this predetermined condition corresponds to a condition that the position specified based on the user position specifying information and the position indicated by the position information associated with the keywords are in a predetermined area. Further, when determining that the predetermined condition is satisfied, the terminal presence accuracy determining unit 845 determines the terminal presence accuracy as, for example, "1". Meanwhile, when determining that the acquired post data is post data transmitted from the mobile terminal 1 as a transmission source through the mobile communication network MN, or when determining that the predetermined condition is not satisfied, the terminal presence accuracy determining unit 845 determines the terminal presence accuracy as, for example, "0".

(b-1) Accuracy Determination Processing Based on Related Data of Post Data

When determining that the predetermined condition is satisfied (determining the terminal presence accuracy as "1") in the above "(b) accuracy determination processing based on post data", if image data is added to the post data, the terminal presence accuracy determining unit 845 acquires an image capturing date from the image data added to the post data and acquires a transmission date of the post data. Further, based on the acquired image capturing date and transmission date, the terminal presence accuracy determining unit 845 determines whether or not a time lag between the image capturing time of the image data and a transmission time of the post data is a predetermined value (for example, several ten seconds) or less. Furthermore, when determining that the time lag between the image capturing time of the image data and the transmission time of the post data is a predetermined value or less, the terminal presence accuracy determining unit 845 determines terminal presence accuracy as, for example, "2" (that is, updates the terminal presence accuracy from "1" to "2"). Meanwhile, when determining that the time lag between the image capturing time of the image data and the transmission time of the post data is not a predetermined value or less, the terminal presence accuracy determining unit 845 determines the terminal presence accuracy as, for example, "1" (that is, maintains the terminal presence accuracy as "1").

(b-1-1) Accuracy Determination Processing Based on Related Data of Post Data

When determining that the time lag is a predetermined value or less in above "(b-1) accuracy determination processing based on related data of post data" (determining the terminal presence accuracy as "2"), if position information is added as, for example, a geotag to the image data added to the post data, the terminal presence accuracy determination unit 845 determines whether or not a predetermined condition to determine that the position indicated by the position information associated with the keywords and the position indicated by the position information of the image data are near is satisfied. This predetermined condition corresponds to, for example, a condition that a distance between a position (for example, a planar position specified by the address or the latitude and the longitude) indicated by the position information associated with the keywords and a position (for example, a planar position specified by the latitude and the longitude) indicated by the position information of the image data is in a predetermined distance. Alternatively, this predetermined condition corresponds to a condition that the position indicated by the position information associated with the keywords and the position indicated by the position information of the image data are in a predetermined area. Further, when determining that the predetermined condition is satisfied, the terminal presence accuracy determining unit 845 determines the terminal presence accuracy as, for example, "3" (that is, updates the terminal presence accuracy from "2" to "3"). Furthermore, when determining that the predetermined condition is not satisfied, the terminal presence accuracy determining unit 845 determines the terminal presence accuracy as, for example, "2" (that is, maintains the terminal presence accuracy as "2").

(b-1-2) Accuracy Determination Processing Based on Related Data of Post Data

When determining that the time lag in above "(b-1) accuracy determination processing based on related data of post data" is a predetermined value or less (determining the terminal presence accuracy as "2"), the terminal presence accuracy determining unit 845 determines whether or not a word or a phrase indicating that an image of the image data added to the post data is captured at a spot matching the keywords included in the post data is included in post data. The phrase provides a meaning when a plurality of words is collected. The word and the phrase are constituent elements of a sentence. This phrase corresponds to, for example, "captured at AA hotel". Meanwhile, a phase "captured at" is configured to be registered in a word list stored in the memory unit 82 in advance, and is configured to be referred to upon decision by the terminal presence accuracy determination unit 845. Further, when determining that words or a phrase indicating that an image is captured at a spot matching the keywords are included in the specified post data, the terminal presence accuracy determining unit 845 determines the terminal presence accuracy as, for example, "2" (that is, updates the terminal presence accuracy from "2" to "3"). Furthermore, when determining that words or a phrase indicating that an image is captured at a spot matching the keywords are not included in the specified post data, the terminal presence accuracy determining unit 845 determines the terminal presence accuracy as, for example, "2" (that is, maintains the terminal presence accuracy as "2").

(b-1-3) Accuracy Determination Processing Based on Related Data of Post Data

When determining that the time lag in above "(b-1) accuracy determination processing based on related data of post data" is a predetermined value or less (determining the terminal presence accuracy as "2"), the terminal presence accuracy determining unit 845 determines whether or not a subject extracted from the image data added to the post data is a predetermined standard subject captured at a spot matching the keywords. Meanwhile, the subject from image data is, for example, extracted by a common image recognizing technique. Further, a feature of the extracted subject is extracted to calculate a feature amount. When a difference between the feature amount calculated in this way and the feature amount of the standard subject set in advance in association with the keywords is a threshold or less, the subject extracted from the image data is decided to be a predetermined standard subject. Further, when determining that the subject extracted from the image data is a predetermined standard object, the terminal presence accuracy determining unit 845 determines the terminal presence accuracy as, for example, "2" (that is, updates the terminal presence accuracy from "2" to "3"). Furthermore, when determining that the subject extracted from the image data is not a predetermined standard object, the terminal presence accuracy determining unit 845 determines the terminal presence accuracy as, for example, "2" (that is, maintains the terminal presence accuracy as "2").

(b-2) Accuracy Determination Processing Based on Related Data of Post Data

When determining that the predetermined condition is satisfied in above "(b) accuracy determination processing based on post data" (determining terminal presence accuracy as "1"), the terminal presence accuracy determining unit 845 determines whether or not words or a phrase (referred to collectively as a "affirmative word" below) expressed assuming that the user of the mobile terminal 1 as the transmission source at a point of transmission time of the post data is at a spot associated with the keywords is included i the post data.

Such an affirmative word corresponds to, for example, "now", "now, . . . ", (" . . . " is a word which is not particularly limited), "currently" and "now". It is assumed that such an affirmative word is highly likely to be posted in front of the spot. In addition, words or phrases included in a former portion and a latter portion of a sentence may correspond to each other. For example, a former portion "now" and a latter portion "in front of" of a sentence such as "now, . . . in front of" are affirmative words configured to agree with each other. Meanwhile, when, for example, only "now" is an affirmative word, an expression which does not assume that the user is not at the spot such as "today is . . . " and "Imabari is beautiful" is included, and therefore affirmative words are preferably formed including a punctuation, a comma and a period. Meanwhile, such an affirmative word is configured to be registered in an affirmative word list stored in the memory unit 82 in advance, and is configured to be referred to upon decision by the terminal presence accuracy determination unit 845. Alternatively, when exclusion words such as "today" and "Imabari" or a black list in which exclusion words are registered are stored in advance in, for example, the memory unit 82, if words or phrases included in the blacklist are included in the post data, the word or the phrase may be configured to be negated upon decision.

Further, when determining that the affirmative word is included in the post data, the terminal presence accuracy determining unit 845 determines the terminal presence accuracy as, for example, "2" (that is, updates the terminal presence accuracy from "1" to "2"). Furthermore, when determining that the affirmative word is not included in the post data, the terminal presence accuracy determining unit 845 determines the terminal presence accuracy as, for example, "1" (that is, maintains the terminal presence accuracy as "1"). In addition, when determining that the affirmative word is included in the post data, the terminal presence accuracy determining unit 845 may determine whether or not a word or a phrase (collectively referred to as a "negative word" below) expressed assuming that the user of the mobile terminal 1 as the transmission source at a point of transmission time of the post data is not at the spot is included in the post data. Meanwhile, a negative word corresponds to, for example, "soon", "shortly", "by now" and "in . . . hours". It is assumed such a negative word is highly likely to be posted from a position which is not near the spot. Meanwhile, such a negative word is configured to be registered in a negative word list stored in the memory unit 82 in advance, and is configured to be referred to upon decision by the terminal presence accuracy determination unit 845. Further, when determining that the negative word is included in the post data, the terminal presence accuracy determining unit 845 determines the terminal presence accuracy as, for example, "1" (that is, updates the terminal presence accuracy from "2" to "1"). Furthermore, when determining that the negative word is not included in the post data, the terminal presence accuracy determining unit 845 determines the terminal presence accuracy as, for example, "2" (that is, maintains the terminal presence accuracy as "2").

(b-3) Accuracy Determination Processing Based on Related Data of Post Data

When determining that the predetermined condition is satisfied in above "(b) accuracy determination processing based on post data" (determining the terminal presence accuracy as "1"), if position information is added to the post data, the terminal presence accuracy determination unit 845 determines whether or not a predetermined condition to determine that the position indicated by the position information associated with the keywords and the position indicated by the position information added to the post data are near is satisfied. This predetermined condition is the same as that of position information added to image data. Further, when determining that the predetermined condition is satisfied, the terminal presence accuracy determining unit 845 determines the terminal presence accuracy as, for example, "2" (that is, updates the terminal presence accuracy from "1" to "2"). Furthermore, when determining that the predetermined condition is not satisfied, the terminal presence accuracy determining unit 845 determines the terminal presence accuracy as, for example, "1" (that is, maintains the terminal presence accuracy as "1").

(c) Accuracy Determination Processing Based on Evaluation Data

When, for example, evaluation data evaluated by the user is acquired, the terminal presence accuracy determining unit 845 determines the terminal presence accuracy as, for example, "1". That there is evaluation data evaluated by the user as to the service means that the user is highly likely to be at a facility related to accommodation service.

The accuracy determination processing indicated by (a) to (c) described above is entirely or partially performed according to the acquired presence accuracy determination data. Further, when the accuracy determination processing indicated by (b) is performed, one or more accuracy determination processing indicated (b-1), accuracy determination processing indicated (b-2) and accuracy determination processing indicated (b-3) may be configured to be performed as described above. Furthermore, when the accuracy determination processing indicated by (b-1) is performed, one or more accuracy determination processing indicated by (b-1-1), accuracy determination processing indicated by (b-1-2) and accuracy determination processing indicated by (b-1-3) may be configured to be performed as described above. As described above, when a plurality of accuracy determination processing is performed, a total of terminal presence accuracies determined by respective accuracy determination processing is calculated.

Next, terminal presence accuracy (a total of the terminal presence accuracies when a plurality of accuracy determination processing is performed) determined by the terminal presence accuracy determining unit 84 is a predetermined value or more (step S10). Meanwhile, a predetermined value is set, for example, higher (to, for example, "3") to further increase accuracy that the mobile terminal 1 is present upon an access. Meanwhile, a predetermined value is set, for example, lower (to, for example, "1") not to increase accuracy that the mobile terminal 1 is present upon an access. Further, when it is determined that the terminal presence accuracy is a predetermined value or more (step S10: YES), the flow proceeds to step S11. Meanwhile, when it is determined that the terminal presence accuracy is not a predetermined value or more (step S10: NO), the flow proceeds to step S12.

In step S11, the position information outputting unit 846 associates and outputs terminal presence position information which indicates the position specified in step S7, and communication carrier information which indicates a communication carrier which operates the mobile communication network MN through which an access related to an access history specified in step S4 is made to, for example, the position managing database 524, and proceeds to step S12.

In step S12, whether or not there is an access history which is not yet specified in step S4 among the access histories acquired in step S2 is determined. Further, when it is determined that there is an access history which is not yet specified in step S4 (step S12: YES), the flow returns to step S4. In step S4 to which the flow returns in this way, an access history which is not yet specified is specified, and the same processing as the above is performed. Meanwhile, when it is determined that there is no access history which is not specified in step S4 (step S12: NO), the processing illustrated in FIG. 5 is finished.

The position information outputted from the position information outputting unit 846 is used to narrow down facilities at which the communication function of the mobile terminal which the user has can be used when the user who uses a facility selects a facility to use. Further, position information outputted from the position information outputting unit 846 is used to determine a facility at which the communication function of the mobile terminal which the user has can be used when a business operator who provides a facility allocates a user who uses the facility (for example, allocates a room at an accommodation facility). In addition, the position information can be used to improve service at a facility.

As described above, the position analysis processing server 5 acquires an access history of an access from the mobile terminal 1 to the server apparatus through the mobile communication network MN, and acquires a service use history including a use period of service used by the user and user position specifying information. When a time indicated by one access history associated with one user corresponds to a use period included in one service use history associated with the user, the position analysis processing server 5 specifies a position specified based on user position specifying information included in the use history, as a position at which the mobile terminal 1 is present upon an access related to the access history, and associates and outputs terminal presence position information which indicates the specified position and communication carrier information which indicates a communication carrier which operates the mobile communication network MN through which an access related to the access history is made. Consequently, according to the present embodiment, a mobile terminal can specify a position at which the mobile terminal can perform communication through the mobile communication network MN without depending on a GPS. In other words, according to the present embodiment, even at, for example, a position of poor visibility at which the GPS does not sufficiently function, it is possible to sufficiently obtain position information which indicates such a position. By this means, it is possible to distinguish and accumulate data which indicates a past record that the communication function (a communication function through the mobile communication network MN) of the mobile terminal 1 is used near a specific spot per communication carrier. Further, it is possible to provide information for making decision as to whether or not the communication function of the mobile terminal 1 is available per communication carrier at a specific spot in a facility such as a hotel to, for example, a user of a hotel through a predetermined web site based on the accumulated data.

Furthermore, according to the present embodiment, a position is specified based on the past record that the mobile terminal 1 can actually access the server apparatus through the mobile communication network MN at a specific spot and, consequently, specify the position of the mobile terminal 1 upon the access at high accuracy and precisely. In addition, according to the present embodiment, terminal presence accuracy is determined by the terminal presence accuracy determining unit 84 and whether or not to associate and output the terminal presence position information and communication carrier information can be controlled depending on whether or not the terminal presence accuracy is a predetermined or more, so that it is possible to further increase reliability of information to be accumulated.

In addition, the above configuration is a configuration unique to the applicant who holds an access history of an access from the mobile terminal 1 to the server apparatus through the mobile communication network MN and a service use history including a use period of service used by a user and user position specifying information, and could be made since the applicant focuses on the task that data which indicates a past record that the communication function of the mobile terminal 1 is used near a specific spot is distinguished and accumulated per communication carrier.

REFERENCE SIGNS LIST

| | |
|---|---|
| 1 | Mobile terminal |
| 2 | Gateway server |
| 3 | Mail processing server |
| 4 | Post processing server |
| 5 | Reservation processing server |
| 6 | Payment management server |
| 7 | Delivery management server |
| 8 | Position analysis processing server |
| MN | Mobile communication network |
| IN | Internet |
| S | Information providing system |

The invention claimed is:

1. An information processing apparatus comprising:
a first acquiring unit that acquires an access history from a memory unit that stores, per user, the access history of an access from a mobile terminal to a server apparatus through a mobile communication network;
a second acquiring unit that acquires a use history from a memory unit that stores, per user, the use history including a use period of time in which a service is to be used by a user and information which contributes to specifying a position of the user at the time when the user uses the service;
a specifying unit that, when a time indicated by one access history associated with one user corresponds to one use period of time included in one use history associated with the one user, specifies a position specified based on the information which contributes to specifying the position included in the one use history, as a position at which the mobile terminal is present at the time of the access related to the one access history; and
an outputting unit that outputs position information which indicates the position specified by the specifying unit and information which indicates a communication carrier which operates the mobile communication network through which the access related to the one access history is made in a manner in which the position information is associated with the information which indicates the communication carrier.

2. The information processing apparatus according to claim 1, further comprising:
a third acquiring unit that acquires time data which indicates at least one of a start time and an end time at which the service is available; and
a determining unit that, based on the time data acquired by the third acquiring unit, determines accuracy indicating that the mobile terminal is present at the position specified by the specifying unit at the time of the access,
wherein, when the accuracy determined by the determining unit is a predetermined value or more, the outputting unit associates and outputs the position information and the information which indicates the communication carrier.

3. The information processing apparatus according to claim 1, further comprising:
a fourth acquiring unit that acquires evaluation data evaluated by the user as to the service used by the user of the mobile terminal; and
a determining unit that, based on the evaluation data acquired by the fourth acquiring unit, determines accuracy indicating that the mobile terminal is present at the position specified by the specifying unit at the time of the access,
wherein, when the accuracy determined by the determining unit is a predetermined value or more, the outputting unit associates and outputs the position information and the information which indicates the communication carrier.

4. The information processing device according to claim 1, further comprising:
a fifth acquiring unit that acquires post data posted by the user as to the service used by the user of the mobile terminal; and
a determining unit that, based on the post data acquired by the fifth acquiring unit, determines accuracy indicating that the mobile terminal is present at the position specified by the specifying unit at the time of the access,
wherein, when the accuracy determined by the determining unit is a predetermined value or more, the outputting unit associates and outputs the position information and the information which indicates the communication carrier.

5. The information processing apparatus according to claim 1, further comprising:
a sixth acquiring unit that acquires related data which is related data of post data posted by the user as to the service used by the user of the mobile terminal, and which contributes to determining a position of the user at the time of transmission of the post data and is acquired in relation to the post data; and
a determining unit that, based on the related data acquired by the sixth acquiring unit, determines accuracy indicating that the mobile terminal is present at the position specified by the specifying unit at the time of the access,
wherein, when the accuracy determined by the determining unit is a predetermined value or more, the outputting unit associates and outputs the position information and the information which indicates the communication carrier.

6. The information processing apparatus according to claim 1, further comprising:
at least two acquiring unit of a third acquiring unit that acquires time data which indicates at least one of a start time and an end time at which the service is available; a fourth acquiring unit that acquires evaluation data evaluated by the user as to the service used by the user of the mobile terminal; a fifth acquiring unit that acquires post data posted by the user as to the service used by the user of the mobile terminal; and a sixth acquiring unit that acquires related data which is related data of post data posted by the user as to the service used by the user of the mobile terminal, and which contributes to determining a position at which the mobile terminal of source of transmission is present at the time of transmission of the post data and is acquired in relation to the post data; and
a determining unit that, based on at least two data of the time data acquired by the third acquiring unit, the evaluation data acquired by the fourth acquiring unit, the post data acquired by the fifth acquiring unit and the related data acquired by the sixth acquiring unit, determines accuracy that the mobile terminal is present at the position specified by the specifying unit at the time of the access, wherein, when the accuracy determined by the determining unit is a predetermined value or more, the outputting unit associates and outputs the position information and the information which indicates the communication carrier.

7. An information processing method executed by a computer comprising:

a first acquiring process of acquiring an access history from a memory unit that stores, per user, the access history of an access from a mobile terminal to a server apparatus through a mobile communication network;

a second acquiring process of acquiring a use history from a memory unit that stores, per user, the use history including a use period of time in which a service is to be used by a user and information which contributes to specifying a position of the user at the time when the user uses the service;

a specifying process of, when a time indicated by one access history associated with one user corresponds to one use period of time included in one use history associated with the one user, specifying a position specified based on the information which contributes to specifying the position included in the one use history, as a position at which the mobile terminal is present at the time of the access related to the one access history; and an outputting process of outputting position information which indicates the position specified by the specifying unit and information which indicates a communication carrier which operates the mobile communication network through which the access related to the one access history is made in a manner in which the position information is associated with the information which indicates the communication carrier.

8. A non-transitory recording medium having an information processing program computer-readably recorded therein which causes a computer to function as:

a first acquiring unit that acquires an access history from a memory unit that stores, per user, the access history of an access from a mobile terminal to a server apparatus through a mobile communication network;

a second acquiring unit that acquires a use history from a memory unit that stores, per user, the use history including a use period of time in which a service is to be used by a user and information which contributes to specifying a position of the user at the time when the user uses the service;

a specifying unit that, when a time indicated by one access history associated with one user corresponds to one use period of time included in one use history associated with the one user, specifies a position specified based on the information which contributes to specifying the position included in the one use history, as a position at which the mobile terminal is present at the time of the access related to the one access history; and an outputting unit that outputs position information which indicates the position specified by the specifying unit and information which indicates a communication carrier which operates the mobile communication network through which the access related to the one access history is made in a manner in which the position information is associated with the information which indicates the communication carrier.

* * * * *